[[# United States Patent Office

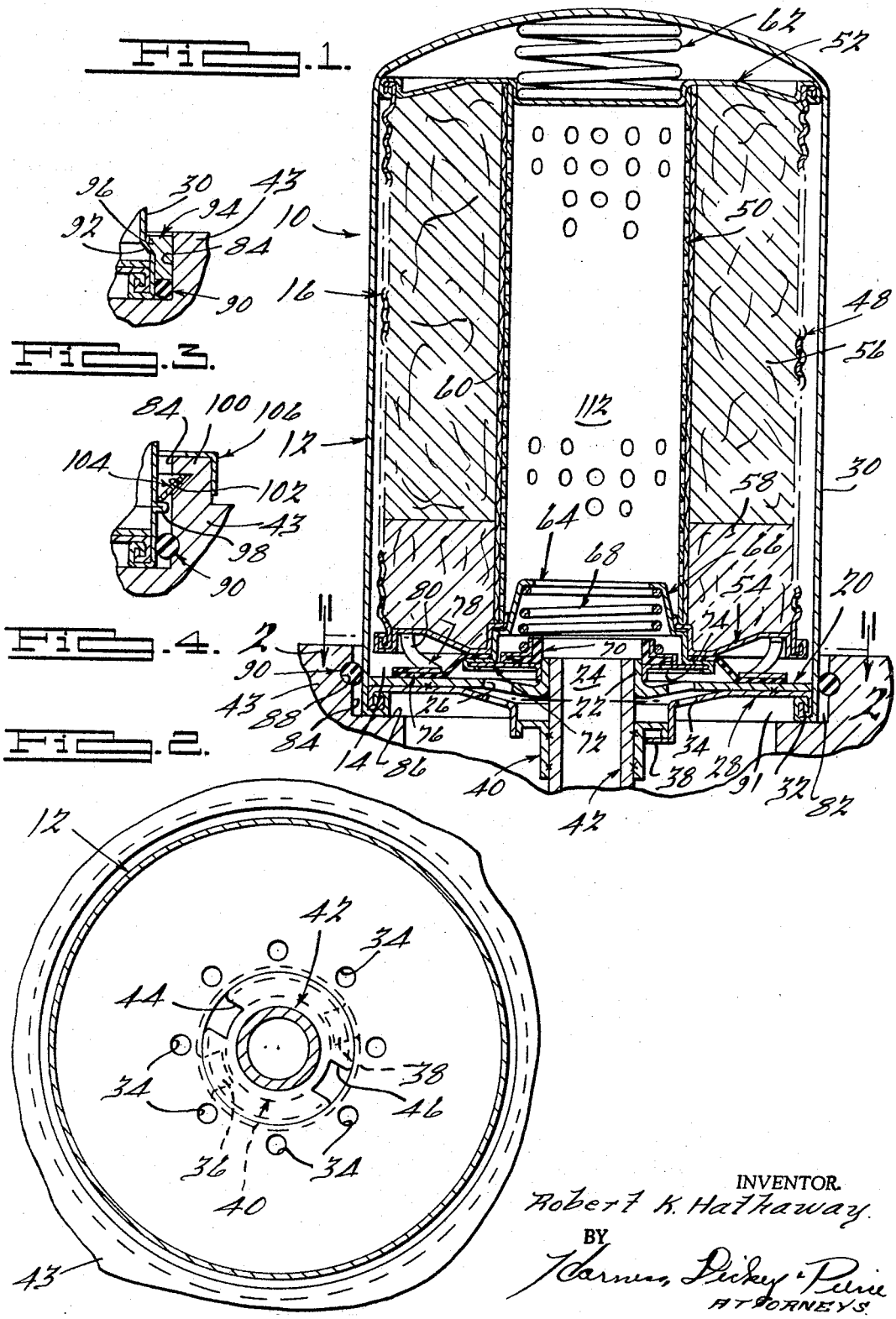

3,325,015
Patented June 13, 1967

3,325,015
FILTER SEAL
Robert K. Hathaway, Racine, Wis., assignor to Walker Manufacturing Company, Racine, Wis., a corporation of Delaware
Filed July 20, 1964, Ser. No. 383,858
4 Claims. (Cl. 210—443)

This invention relates generally to fluid filters, and more particularly, to a disposable or throw-away oil filter unit for use in the lubrication system of an automotive engine.

It has heretofore been the practice in the construction of automotive and similar type internal combustion engine oil filters to provide sealing means in the form of a ring-shaped gasket between the lower end of the filter unit and a fixed portion of the engine block. In general, the present invention is directed toward an oil filter of the above character which obviates the need for such a ring-shaped gasket through the use of a simple O-ring type seal that extends around the outer periphery of the filter casing and resiliently engages an annular shoulder formed by the engine's filter mount.

It is an object of the present invention to provide a disposable oil filter that is provided with effective sealing means which is substantially less sensitive than similarly functioning sealing means heretofore known and used.

It is another object of the present invention to provide an improved oil filter having sealing means of the same effectiveness and life as similar type filters heretofore known, but which is substantially less expensive to commercially produce.

It is still another object of the present invention to provide an oil filter of the above character that is considerably more resistant to deformation resulting from excessive internal fluid pressures.

It is yet another object of the present invention to provide a disposable oil filter of the above character that permits rapid mounting and dismounting, thereby providing for a faster servicing.

Other objects and advantages of the present invention will become apparent from the following detailed description taken in conjunction with the accompanying drawing, wherein:

FIGURE 1 is a longitudinal cross-sectional view of a disposable oil filter and mounting means therefor in accordance with an exemplary embodiment of the present invention, FIGURE 2 is a fragmentary cross-sectional view taken along the line 2—2 of FIGURE 1, FIGURE 3 is a fragmentary cross-sectional view of an alternate construction of the present invention, and FIGURE 4 is a fragmentary cross-sectional view of still another construction of the present invention.

Referring now to FIGURE 1 of the drawing, a disposable oil filter 10, in accordance with an exemplary embodiment of the present invention, includes an inverted cup-shaped filter housing 12 having an open end 14 and enclosing an annular filter element or cartridge 16. Disposed within the lower open end 14 of the housing 12 is a relatively heavy gauge reinforcing plate 20 having a central upwardly extending neck or sleeve section 22 that defines a central outlet passage 24. A plurality of circumferentially spaced inlet ports, generally designated 26, are formed in the reinforcing plate 20 radially outwardly from the sleeve section 22.

The reinforcing plate 20 is secured within the filter housing's open end 14 by an annular base plate 28 which is spotwelded to the lower side of the plate 20 and is connected at its outer periphery to the lower end of the filter housing's side wall, generally designated 30, in a fluid-tight roll seam or joint 32. The base plate 28 is provided with a plurality of circumferentially spaced inlet ports 34 which are in substantial radial and circumferential alignment with the inlet ports 26 in the reinforcing plate 20. The inner periphery of the base plate 28 extends downwardly or away from the reinforcing plate 20 and is formed with a pair of diametrically opposed and radially inwardly projecting locking flanges 36 and 38, the latter of which may be seen in FIGURE 1. The locking flanges 36 and 38, together with a locking sleeve member 40 that is spotwelded to the upper end of a cylindrical standpipe 42 which extends upwardly from a filter mount section 43 of the associated automobile engine block (not shown), form a bayonet type locking assembly. The filter unit 10 is adapted to be slid axially onto the standpipe 42 when the locking flanges 36 and 38 are properly aligned with a pair of complementary shaped and diametrically opposed recesses 44 and 46 formed in the locking sleeve member 40, whereby the sleeve section 22 of the reinforcing plate 20 will receive the upper end of the standpipe 42, as illustrated in FIGURE 1. The entire filter unit 10 may be rotated (approximately 45°) on the standpipe 42 to lockingly engage the flanges 36 and 38 with the sleeve member 40, thereby rigidly securing the filter unit 10 to the filter mount section 43 of the engine block.

The filter cartridge 16, which is of a construction that is intended to be only exemplary insofar as filter cartridges are concerned, comprises a perforate cylindrical outer shell 48, a perforate cylindrical inner shell or center tube 50 that is coaxially aligned with the shell 58, and upper and lower end caps or plates 52 and 54, respectively. The cartridge 16 is shown as containing two axially adjacent filter elements 56 and 58; however, it will be apparent that such a construction may be replaced by a single filter element in accordance with the requirements of certain filter applications. A cloth sleeve 60 is provided around the center tube 50 to prevent possible migration of the filtering material through the perforations in the center tube 50. The filter cartridge 16 is supported within the casing 14 between a compression spring 62 which extends between the upper end of the casing 12 and the filter cartridge's upper end cap 52, and a pressure relief valve assembly, generally designated 64, that is supported on the reinforcing plate 20 coaxially of the sleeve section 22.

The relief valve assembly 64 generally includes a valve housing 66, a valve spring 68, and an annular valve member 70 which is adapted to resiliently engage a valve seat 72 having a plurality of by-pass ports, generally designated 74. The specific construction and operation of the valve assembly 64 is more particularly set forth in copending application Ser. No. 208,863, filed July 10, 1962, and having the same assignee as the present invention.

As seen in FIGURE 1, an anti-drain back valve is provided within the filter 10 by means of a resilient annular valve disk 76 that is yieldably urged into engagement with the upper surface of the reinforcing plate 20 by an annular spring member 78 which is provided with a plurality of upwardly extending tang sections 80 that bear against the bottom of the filter cartridge's lower end cap 54.

In accordance with the principles of the present invention, the filter mount section 43 of the automobile engine block (not shown) is formed with an annular cup-shaped recess or cavity 82 having a downwardly and circumferentially extending side wall 84 which terminates at its lower end in an inwardly extending annular support surface 86. It will be seen that when the locking flanges 36 and 38 on the base plate 28 are lockingly engaged with the locking sleeve member 40, the lower edge of the roll seam 32 bears upon the annular support surface 86. An annular recess 88, which is generally semi-circular in cross section, is formed around the side wall 84 and is adapted to support an outer circumferential section of an O-ring sealing member 90 that extends around the outer periphery of the lower end of the filter housing's side wall 30. Upon mounting the filter 10 on the standpipe 42, the O-ring 90 is adapted to be radially compressed between the filter housing's side wall 30 and the recess 88, thereby providing an effective fluid-tight seal between the interior of the filter mount recess 82 and the exterior of the filter unit 10.

Referring now to FIGURE 3, in an alternate construction of the present invention, the lower end of the filter housing's side wall 30 is flared outwardly, as seen at 92, and the O-ring sealing member 90 is compressed between the filter mount's circumferentially extending side wall 84 and the outer periphery of the filter housing's roll seam 32. The sealing member 90 is operatively maintained in the above-described position by a split ring retaining member 94 which extends around the outer periphery of the filter housing's side wall 30 and which is adapted to be inserted in the annulus defined between the side wall 30 and the filter mount's circumferential wall 84. The retaining member 94 is constructed such that it will expand into engagement with the filter mount's side wall 84, and thereby be maintained within the above described annulus under a slight compressive force. The inner periphery of the member 94 is formed with a radially inwardly projecting wedge portion 96 which is adapted to surmount and engage the outwardly extending flare section 92 of the filter housing's side wall 30, thereby resisting axial (upward) movement of the housing 12 within the filter mount section 43.

Referring now to FIGURE 4, in still another construction of the present invention, the lower end of the filter housing's side wall 30 is formed with a radially outwardly extending annular shoulder or lip section 98 which projects outwardly above the sealing member 90 into the annulus defined between the filter mount's circumferential wall 84 and the outer periphery of the filter housing's side wall 30. The upper surface of the filter mount section 43 is formed with an upwardly projecting portion 100 around which is formed a radially outwardly extending notch or recess 102. A split ring retaining member 104 whose upper end is somewhat larger in diameter than the lower end thereof, is adapted to be inserted into the annulus between the wall 84 and the filter housing side wall 30, which member is then adapted to expand slightly, whereby the member's upper end will become nested within the annular recess 102 and its lower end will engage the top of the annular lip 98, as seen in FIGURE 4. The retaining member 104, when thus positioned between the filter housing's side wall 30 and the filter mount's side wall 84, effectively resists any relative axial movement between the filter housing 12 and the filter mount section 43. It may be noted that for certain filter installations, it is possible to provide a reinforcing band or ring 106 around the outer periphery of the filter mount's section 100, thereby increasing the hoop strength of the section 100. It may be further noted that the retaining member 104, together with the member 94 incorporated in the construction illustrated in FIGURE 3, is adapted to be "peeled" out of the annulus defined between the outer periphery of the filter housing side wall and the circumferential wall 84 of the filter mount section 43, thereby permitting easy removal and replacement of the filter 10.

A particular feature of the O-ring type sealing member 90 incorporated in each of the above described constructions of the present invention, resides in the fact that each of these constructions eleminates the need for providing a gasket between the lower side of the base plate 28 and the filter mount section 43, and thus the present invention obviates the necessity of forming the base plate 28 with any gasket retaining detents, flanges, grooves or the like. Accordingly, it will be seen that by using the O-ring type sealing device of the present invention, the construction of the filter 10 will be considerably simplified and the cost of manufacturing the filter 10 may be materially reduced without any sacrifice in the effectiveness of the sealing means therefor.

Still another feature of the O-ring type sealing means of the present invention resides in the fact that the O-ring type seal is considerably less sensitive to filter movement than the conventional gasket means employed on heretofore known and used disposable filter units. Accordingly, the filter 10, when mounted in accordance with the principles of the present invention, may be subjected to substantially more strenuous road vibrations without possible leakage occurring between the interior of the filter mount 43 and the exterior of the filter 10. Also, because the O-ring sealing member 90 bears directly against the outer periphery of the filter housing's side wall 30, the member 90 functions to resist outward movement or deformation of the filter housing's side wall 30 resulting from excessive internal fluid pressure within the housing 12. A still further feature of the above described filter construction and detachable mounting means therefor, will be seen from the fact that the filter 10 may be easily removed by a simple rotative manipulation, thereby permitting fast replacement and servicing.

In operation, oil flows from the engine's lubrication system through suitable fluid passages in the automobile engine block and into an annular inlet chamber 108 defined by the filter mount section 43 and the base plate 28. Assuming the proper pressure differential across the filter cartridge 16, the oil then flows through the inlet ports 34 and 26 in the base plate 28 and reinforcing plate 20, respectively, and thereafter into an annular chamber 110 which is defined by the filter cartridge's outer shell 48 and the side wall 30 of the housing 12. From the chamber 110, the oil passes radially inwardly through the filter cartridge 16 and into a central chamber 112 defined by the center tube 50. The oil then flows downward in the chamber 112 through the relief valve housing 66 and into the standpipe 42, from where it is returned to the engine's lubrication system.

In the event that the back pressure within the chamber becomes excessive, for example, when the filter cartridge 16 becomes clogged, unfiltered oil is forced upward through the relief ports 74 in the valve assembly 64 and into the central chamber 112, from where the oil passes downward through the standpipe 42 to be returned to the engine's lubrication system.

While it will be apparent that the exemplary embodiments herein illustrated are well calculated to fullfill the objects above stated, it will be appreciated that the present invention is susceptible to modification, variation and change without departing from the proper scope or fair meaning of the subjoined claims.

What is claimed is:

1. A filter assembly comprising a filter mount construction and a disposable filter construction, said filter construction including a tubular housing closed at both ends and containing a filter means and having fluid inlet and outlet means in one closed end, said mount construction including a recess receiving the closed end of the filter construction and having fluid ports in operative communication with said fluid inlet and outlet means when said filter construction is mounted in said recess, said recess having a side wall and a bottom face, circumferential seal means disposed between the side wall of said recess and the outside of the tubular housing to prevent leakage from said ports when said filter construction is mounted in said recess, the one closed end of said housing being in surface contact with said bottom face when said filter construction is mounted in said recess and there being no gasket means between said closed end and bottom face, and non-threaded attachment means for attaching the filter construction to the mount construction in said recess and involving essentially longitudinal movement of the filter construction to seat said filter construction on said bottom face, said attachment means comprising first and second shoulder means on said respective constructions which engage each other to prevent withdrawal of the filter construction from the recess.

2. An assembly as set forth in claim 1 wherein said attachment means comprises a bayonet joint construction.

3. An assembly as set forth in claim 1 wherein said attachment means comprises a removable lock ring seating in the wall of said recess and said first shoulder means being formed on said housing and engaging said lock ring.

4. An assembly as set forth in claim 1 wherein said seal means comprises a resilient O-ring.

References Cited

UNITED STATES PATENTS

| | | | |
|---|---|---|---|
| 2,059,358 | 11/1936 | Johnston et al. | 210—440 X |
| 2,562,361 | 7/1951 | Kasten | 210—443 X |
| 2,801,751 | 8/1957 | Thomas | 210—444 X |
| 2,991,885 | 7/1961 | Gutkowski | 210—444 X |
| 3,200,953 | 8/1965 | Komarmy. | |

REUBEN FRIEDMAN, *Primary Examiner.*

F. MEDLEY, *Assistant Examiner.*